(No Model.) 2 Sheets—Sheet 2.
J. G. RODGERS.
APPARATUS FOR PLACING TIRES ON WHEELS.
No. 595,548. Patented Dec. 14, 1897.
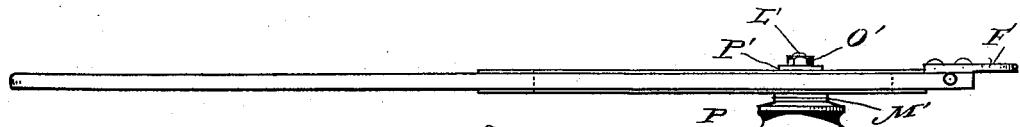
Fig. 4.
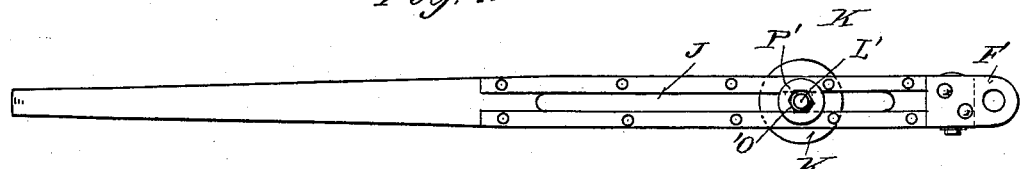
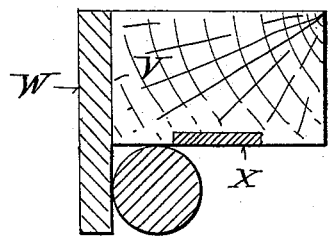
Fig. 5.  Fig. 6.
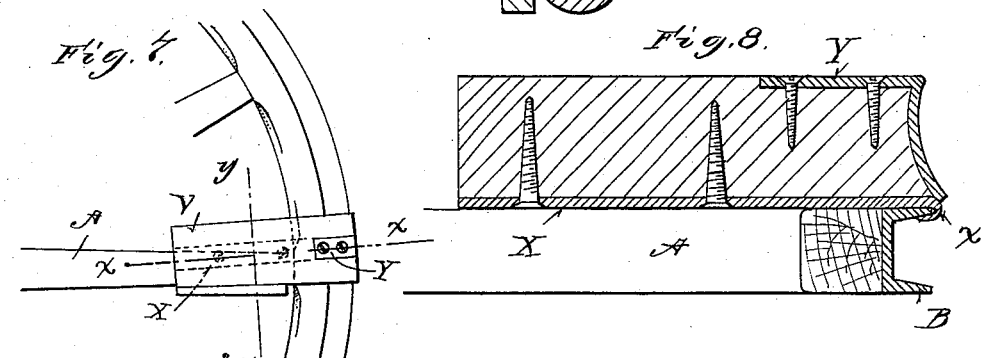
Fig. 7.  Fig. 8.
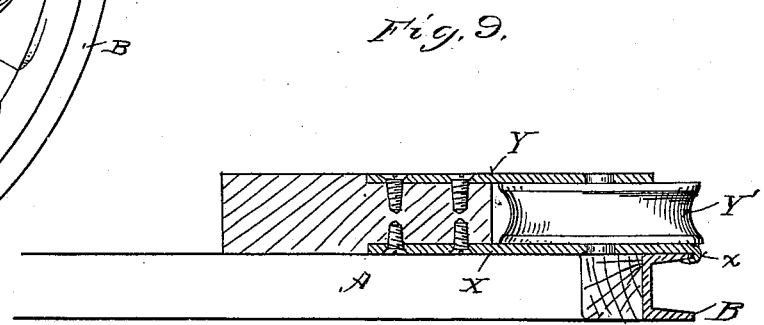
Fig. 9.
Witnesses  Inventor
James G. Rodgers,
By his Attorney

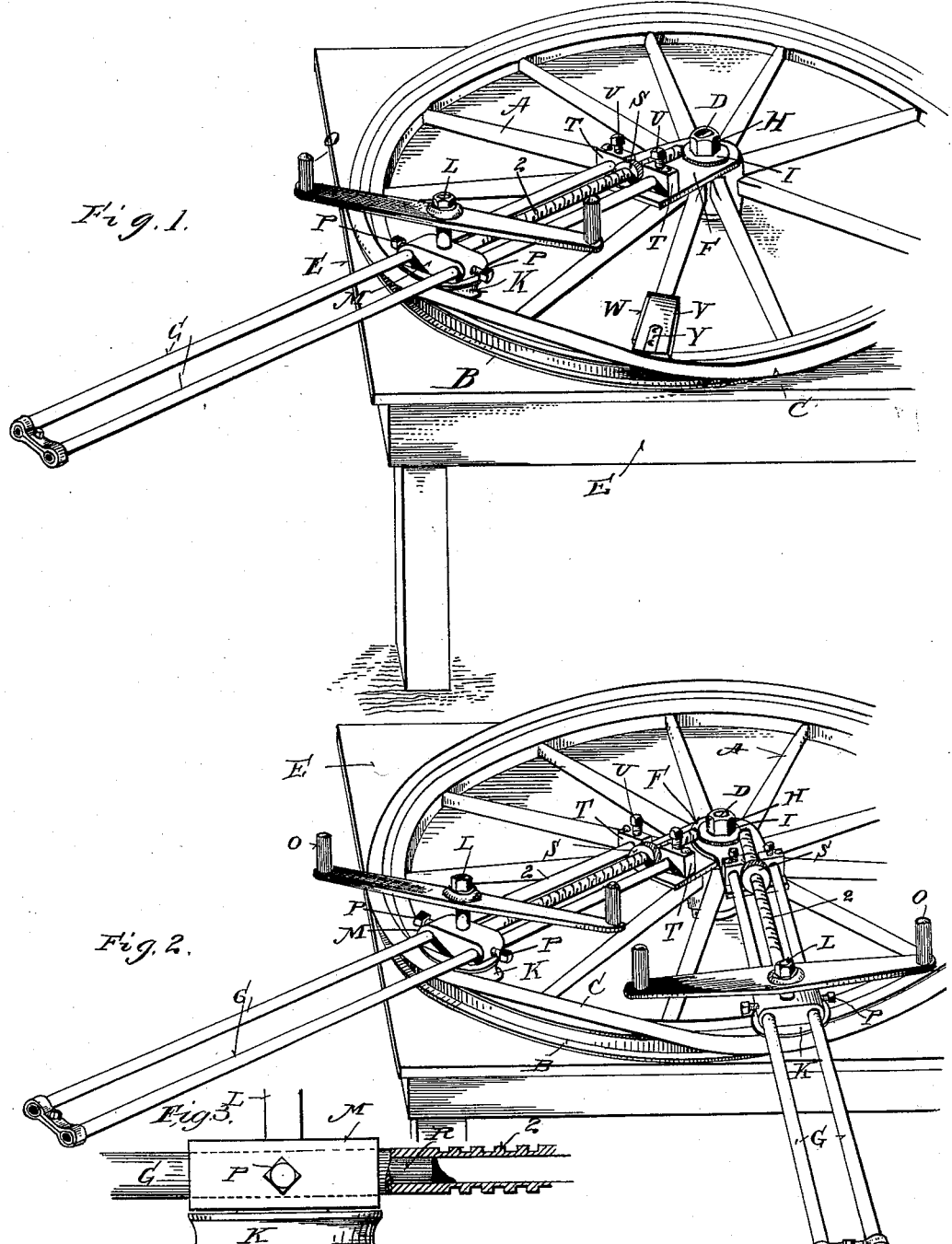

UNITED STATES PATENT OFFICE.

JAMES G. RODGERS, OF SPRINGFIELD, OHIO.

APPARATUS FOR PLACING TIRES ON WHEELS.

SPECIFICATION forming part of Letters Patent No. 595,548, dated December 14, 1897.

Application filed July 27, 1896. Serial No. 600,604. (No model.)

*To all whom it may concern:*

Be it known that I, JAMES G. RODGERS, a citizen of the United States, residing at Springfield, in the county of Clark and State of Ohio, have invented certain new and useful Improvements in Apparatus for Placing Tires on Wheels, of which the following is a specification, reference being had therein to the accompanying drawings.

This invention relates to improvements in apparatus for placing rubber tires upon vehicle-wheels.

The invention consists, essentially, of a lever and a stop-block, the lever being adapted to swing around the wheel-center and having a roller to engage with the tire and a block being adapted to connect with the wheel and to coöperate with the lever by holding the tire at one point while the lever travels toward it.

The invention further consists in providing such lever and such block, or either of them, with a rotatable roller, and in the case of said lever with means to rotate said roller to make it travel on the tire, to prevent the crowding of the rubber, and to lessen the manual effort necessary to swing the lever during the last part of its movement.

In the accompanying drawings, on which like reference-letters indicate corresponding parts, Figure 1 is a perspective view of a vehicle-wheel and rubber tire with my apparatus applied thereto; Fig. 2, a like view with two levers applied to the wheel; Fig. 3, a sectional view in detail, showing the connection between one of the sliding heads and its adjusting screw-shaft; Fig. 4, an edge view of another form of lever which may be used when only one lever is employed; Fig. 5, a plan view of the lever shown in Fig. 4; Fig. 6, a transverse sectional view of the stop-block and one spoke; Fig. 7, a partial plan view of a wheel with such block applied; Fig. 8, a detail enlarged sectional view of such block and a cross-section of a wheel-rim and channel-iron, and Fig. 9 a similar view of the block in the form having a roller.

At A is shown such a vehicle-wheel as is to have put within its channel-iron B a rubber tire, say of the type wherein a metallic cable or wire runs through the tire. In such cases the retaining-cable is of a little greater circumference than the bed of the channel-iron. The rubber is sufficiently turned to embed this retaining-cable in it enough to enable the last part to be inserted to be sprung over the flange of the channel-iron along with the rubber. Such a tire is shown at C.

A central stud D is secured to a support— say E—in the nature of a table or bench. On this stud is mounted the wheel and one lever according to the preferred form of my invention, or two levers of the modified form shown in Fig. 2. These levers consist of a plate F and one or more bars G, two bars being the preferred form of construction. The plate F is adapted to be mounted on a central stud D and held there by the nut H with its washer I. A slot or space is left between the bars G when two bars are used or the equivalent slot J is provided, as shown in Fig. 5. A grooved wheel K is carried by the lever, and in the preferred form of lever the shaft L of this pulley is rotatably mounted in an adjustable head M and has a crank O, by which the shaft is rotated, and hence the wheel is revolved when desired. In the other form (shown in Figs. 5 and 6) the wheel is mounted on a fixed shaft L', shouldered, as shown, at M' and having a nut O', with intervening washers P', by which the shaft is clamped to the lever, although it is adjustable, as in the other form, yet there is no means to rotate the wheel by hand.

Referring again to the preferred form of lever it will be seen that the head carries set-screws P, by which it is fastened to the bars of the lever, and also that on a stud R, projecting from the head, is placed a hollow screw-threaded shaft Q, having a milled nut S, adapted to work against projections T on the plate F, so as to adjust the head M outwardly to bring it practically in line with the flange of the wheel. Screws U serve to hold the bars G in the projections T.

In using this apparatus either the form of lever shown in Fig. 1 may be used in conjunction with the stop-block V, or the form of lever shown in Figs. 4 and 5 may be used in connection with such stop-block. The preferred form is the first one because of the means to rotate the wheel K. It will also be understood that in some cases I may employ a pair of my improved form of levers, as shown in Fig. 2, in which case the plates F overlap one another and are both mounted on the central stud D. Referring to this block V, it will be seen that it has a plate W to engage the edges of a spoke, as clearly seen in Fig. 6, and that it also has a hook-plate X, whose hook x engages the channel-iron. The block further has a plate Y to prevent wear. Another form of block is shown in Fig. 9, in which a pulley or wheel Y' is employed. This pulley allows the rubber tire to move across the block without binding and with less friction, so that if the rubber tends to crowd and unduly compress or stretch in any one place it is given greater freedom to equalize its condition.

Referring now to the manner in which my apparatus is used, it will be seen that on arranging the apparatus as in Fig. 1, which shows the preferred arrangement, the tire is in the channel-iron, except as to a small part. The block V resists the tire, which otherwise would spring inward and out of the channel-iron while the lever is being moved up toward the block. In practice it is found that rubber will crowd and compress between the lever and block or between two levers, if used as arranged in Fig. 2. To overcome this crowding of the rubber and the consequent resistance it offers to bringing the lever up to the block or the two levers together, I provide means for rotating the wheel K by hand. By turning this wheel slowly the lever will travel in the right direction with less manual labor exerted directly on the lever, thus reducing the labor from what is most irksome to what is exceedingly easy and thus also overcoming the crowding effects of a wheel incapable of direct rotation. This apparatus has been thoroughly tested in actual use and performs the work in a most satisfactory manner.

Should two levers be employed, the wheels may be rotated by hand in the same manner.

Having thus fully described my invention, what I claim as new, and desire to secure by Letters Patent, is—

1. In an apparatus for placing rubber tires on wheels, the combination with a lever adapted to be mounted on a central stud and to be swung along the wheel-rim and having a wheel to engage the tire, of a stationary stop-block detachably secured to the outer part of the wheel and arranged to hold against the inner side of the tire and prevent the springing of the tire from out of the rim, substantially as shown and described.

2. In an apparatus for placing rubber tires on wheels, a lever adapted to be mounted on a central stud, a wheel mounted on the lever, and means to positively rotate said wheel on its own axis as the lever is swung on said center, and a stationary stop-block adapted to resist the springing of said tire out of the rim.

3. In an apparatus for placing rubber tires on wheels, the combination with a lever having a slidable head, means to fix the same, and an adjustable screw-shaft, a wheel mounted on the shaft carried by said head, and a crank on said shaft to rotate said wheel, the lever being adapted to be mounted on a central stud, of a stop-block having a hook to engage with the vehicle-wheel and a plate to engage with the spoke and adapted to resist a tire.

4. In an apparatus for placing rubber tires on wheels, the combination with a lever consisting of a plate, projections on the plate, rods carried by said projections, a head slidable on the rods, a shaft rotatable in the head, a crank on one end of the shaft and a wheel on the other, a screw-threaded shaft engaging with the head and having a nut engaging with the projections on the plate, of a stop-block having a hook to engage with the channel-iron, and a plate to engage with a spoke, to resist the tire.

In testimony whereof I affix my signature in presence of two witnesses.

JAMES G. RODGERS.

Witnesses:
 EDWIN L. ARTHUR,
 W. M. MCNAIR.